US008065729B2

(12) United States Patent
Yi et al.

(10) Patent No.: US 8,065,729 B2
(45) Date of Patent: Nov. 22, 2011

(54) METHOD AND APPARATUS FOR GENERATING NETWORK ATTACK SIGNATURE

(75) Inventors: Sung Won Yi, Daejeon (KR); Hwa Shin Moon, Daejeon (KR); Young Chan Shin, Daejeon (KR); Jin Tae Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 955 days.

(21) Appl. No.: 11/947,673

(22) Filed: Nov. 29, 2007

(65) Prior Publication Data

US 2008/0134331 A1 Jun. 5, 2008

(30) Foreign Application Priority Data

Dec. 1, 2006 (KR) .................. 10-2006-0120356
May 22, 2007 (KR) .................. 10-2007-0049869

(51) Int. Cl.
*G06F 11/00* (2006.01)
*G06F 12/14* (2006.01)
*G06F 15/173* (2006.01)
*H04L 9/32* (2006.01)

(52) U.S. Cl. ........... 726/22; 713/168; 713/188; 709/224
(58) Field of Classification Search .............. 726/22; 713/188, 168; 709/224
See application file for complete search history.

(56) References Cited

U.S. PATENT DOCUMENTS

| | | | |
|---|---|---|---|
| 5,440,723 A | 8/1995 | Arnold et al. | |
| 7,359,962 B2 * | 4/2008 | Willebeek-LeMair et al. | 709/223 |
| 7,519,998 B2 * | 4/2009 | Cai et al. | 726/24 |
| 7,587,759 B1 * | 9/2009 | McArdle et al. | 726/22 |
| 7,624,446 B1 * | 11/2009 | Wilhelm | 726/23 |
| 2003/0033435 A1 | 2/2003 | Hanner | |
| 2004/0255162 A1 | 12/2004 | Kim et al. | |
| 2005/0229254 A1 | 10/2005 | Singh et al. | |
| 2005/0281291 A1 * | 12/2005 | Stolfo et al. | 370/506 |
| 2006/0156404 A1 | 7/2006 | Day | |
| 2006/0161986 A1 * | 7/2006 | Singh et al. | 726/24 |
| 2007/0297333 A1 * | 12/2007 | Zuk et al. | 370/235 |
| 2008/0120721 A1 * | 5/2008 | Moon et al. | 726/23 |

FOREIGN PATENT DOCUMENTS

| | | |
|---|---|---|
| JP | 2005045649 | 2/2005 |
| KR | 1020040099864 A | 12/2004 |
| KR | 2006-0034581 A | 4/2006 |
| KR | 1020060079712 A | 7/2006 |
| KR | 100620313 B1 | 8/2006 |
| KR | 2006-0099050 A | 9/2006 |
| KR | 1020060112622 A | 11/2006 |
| WO | WO 2004/107707 A1 | 12/2004 |

OTHER PUBLICATIONS

James Newsome et al., "Polygraph: Automatically Generating Signatures for Polymorphic Worms", Security and Privacy, 2005 IEEE Symposium, p. 226-241, May 2005.

* cited by examiner

*Primary Examiner* — Michael Pyzocha

(57) ABSTRACT

Provided is a method and apparatus for generating a network attack signature capable of generating a signature having a high reliability while minimizing a whitelist used to prevent false positive. An application header and application data are separated from each other to measure byte distributions of the application header and the application data from an input packet. When an attack signature is generated by analyzing the measured byte distributions, a substring of the application data is used to generate the attack signature, and a substring of the application header is used as supporting information on the signature.

17 Claims, 4 Drawing Sheets

METHOD AND APPARATUS FOR GENERATING NETWORK ATTACK SIGNATURE

CROSS-REFERENCE TO RELATED APPLICATIONS

This application claims the priority of Korean Patent Application No. 10-2006-0120356 filed on Dec. 1, 2006, and the priority of Korean Patent Application No. 10-2007-0049869 filed on May 22, 2007, in the Korean Intellectual Property Office, the disclosure of which is incorporated herein by reference.

BACKGROUND OF THE INVENTION

1. Field of the Invention

The present invention relates to generating signature for network attack detection, and more particularly, to a method and apparatus for generating a network attack signature having a high reliability while minimizing a whitelist used to prevent false positive.

The present invention was supported by the IT R&D program of MIC/IITA. [2006-S-042-01, program title: Development of signature generation and management technology against Zero-day Attack]

2. Description of the Related Art

As a method used to protect a network or a computer, there is a method of filtering a packet having an attack signature by using pattern matching. In order to apply the method, a high-reliability attack signature has to be rapidly generated, and researches thereon have been carried out.

The attack signature automatic generation starts from an assumption that "a particular byte-sequence for attacking when a network attack occurs is included and the byte-sequence frequently occurs". Examples of a conventional network-based signature generation technique based on the assumption includes as follows.

First, there is a method called Earlybird. In this method, a hash value is calculated by using a karp-rabin fingerprinting scheme, the calculated hash value is sampled (for example, sampled at a rate of 1/64), and a frequency of the corresponding hash value is recoded in a table. In addition, signatures that frequently occur in a network are selected from the hash values recorded n the table, and an address distribution of packets thereof is analyzed to generate a worm signature.

Second, there is a method called Autograph. In this method, a session which is suspected as an attack from among sessions connecting to a network, that is, traffic that cannot successfully set a session is stored, a content of a corresponding packet is reassembled, and the reassembled packet content is analyzed to generate a signature. Here, in order to separating a session suspected as the attack, an suspicious traffic detection technique such as port scan detection is mainly used, and a method of analyzing the assembled packet content is similar to that used in the aforementioned Earlybird.

The Autograph is different from the Earlybird in that the Autograph uses by combining the entire sessions but not each packet, and a content-based payload partitioning (COPP) scheme is used to extract a substring and a hash value thereof. Therefore, a payload that occurs in the Autograph has a variable size.

Last, there is an extended Polygraph method proposed to apply the aforementioned Autograph to a polymorphic worm. The Polygraph method shares a basic structure with the Autograph but is different from the aforementioned two methods in that several substrings instead of a single substring are combined to generate a signature. For this, the Polygraph method extracts a substring called a token, and the extracted substrings are used to generate a combination type signature without an order, a signature having an order, and a signature based on a statistical method, according to signature generation methods.

However, the network/computer protection method using the pattern matching that starts from the assumption that "a particular byte-sequence for attacking when a network attack occurs is included and the byte-sequence frequently occurs" has a problem of high false-positive rates. In order to solve the problem, the aforementioned three methods employ a whitelist.

The whitelist is a kind of database managed to avoid that a general byte-sequence that is not to be generated as an attack signature is repeatedly generated as the attack signature.

As a representative content included in the whitelist, there are application protocol headers. For example, since a web traffic is based on hypertext transfer protocol (HTTP), a frequency of methods such as get_message used in the HTTP is higher than that of other byte-sequences used for a payload. This example is applied to other applications such as peer-to-peer (P2P), file transfer protocol (FTP), simple mail transfer protocol (SMTP), and the like.

However, the number of application protocols used for the Internet is ten thousands or more, and the number of keywords (or methods) used therefor is very large. Therefore, when these are included in the whitelist, the whitelist becomes heavy, a time taken to retrieve the whitelist increases, and this causes a problem in that attack signature generation and real-time application are delayed.

SUMMARY OF THE INVENTION

An aspect of the present invention provides a method and apparatus for generating a network attack signature capable of rapidly generating a signature having a high reliability and minimizing a whitelist by separating a keyword such as an application protocol header which may cause false positive and is an obstacle to manage the whitelist when the attack signature is generated.

According to an aspect of the present invention, there is provided a method of generating a network attack signature including: measuring byte distributions of an input packet by separating an application header from application data; and extracting an attack signature by combining the measured byte distribution of the application header with the byte distribution of the application data.

According to another aspect of the present invention, there is provided an apparatus for generating a network attack signature including: a substring extraction module extracting substrings from an input packet, classifying the substrings into an application header and application data, and measuring byte distributions of the extracted substrings; and a signature generation module generating an attack signature from a substring having a frequency of a predetermined value or more by combining the byte distribution of the application header and the byte distribution of the application data measured by the substring extraction module.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
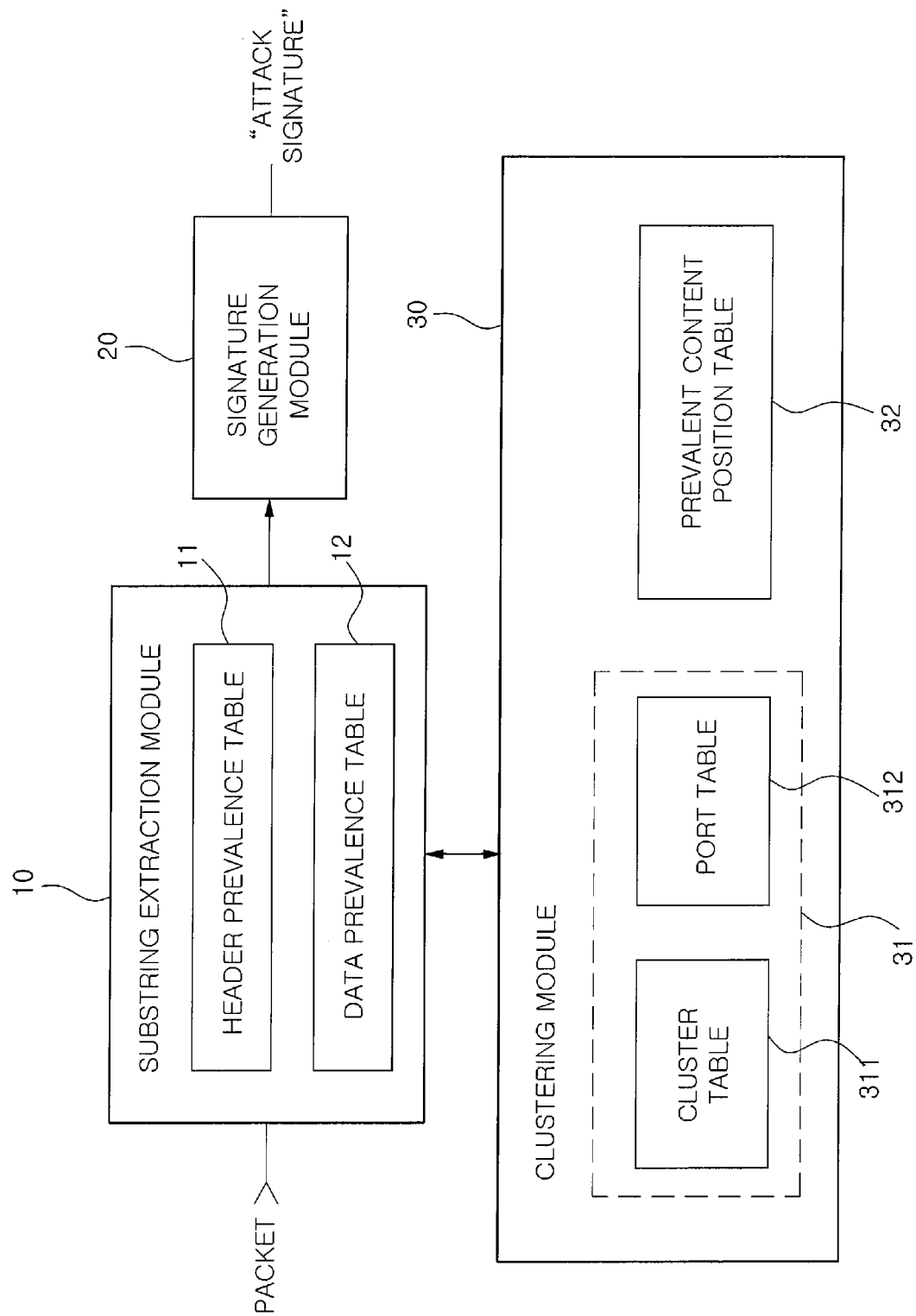
FIG. 1 is a block diagram illustrating an apparatus for generating a network attack signature according to an embodiment of the present invention.

Exemplary embodiments of the present invention will now be described in detail with reference to the accompanying drawings. In the description, the detailed descriptions of well-known functions and structures may be omitted so as not to hinder the understanding of the present invention.

Like reference numerals designate like elements throughout the specification

In addition, in the specification, it should be noted that when a portion "is connected to" the other portion, the portion can be directly connected thereto or indirectly connected thereto with intervening elements present. In addition, it should be noted that a phrase that a portion "includes" an element means that the other element is not excluded but it can be further included therein if a particularly contrary phase is not disclosed.

In addition, it should be noted that a term "module" disclosed in the specification denote a unit for performing at least one function or operation, and it can be implemented in combination of hardware, software, or hardware and software.

FIG. 1 is a functional block diagram illustrating an apparatus for generating a network attack signature according to an embodiment of the present invention.

Referring to FIG. 1, the apparatus for generating a network attack signature includes a substring extraction module 10, a signature generation module 20, and a clustering module 30. In addition, the apparatus further includes a header prevalence table 11 and a data prevalence table 12 for managing byte distributions and a cluster table 311, a port table 312, and a prevalent content position table 32 for performing clustering and estimating an application header length.

The substring extraction module 10 extracts substrings from an input packet and classifies the substrings into an application header and application data to measure byte distributions of the extracted substrings.

The signature generation module 20 combines a byte distribution of the application header and a byte distribution of the application data measured by the substring extraction module 10 to generate an attack signature from a substring of a frequency of a predetermined value or more.

The header prevalence table 11 manages frequencies of the substrings that are classified into the application header by the substring extraction module 10, and the data prevalence table 12 manages frequencies of the substrings that are classified into the application data by the substring extraction module 10. Here, the header prevalence table 11 and the data prevalence table 12 may be implemented into a single table for convenient implementation and effective application of a memory. In this case, an item for distinguishing the application header and the application data has to be included in the table.

The substring extraction module 10 measures the byte distribution of the substring according to flow or ports and classifies the extracted substrings on the basis of an application header length estimated according to ports or sessions.

The clustering module 30 is a unit for periodically clustering the ports. Accordingly, the substring extraction module 10 can measure a byte distribution according to clusters by checking corresponding cluster information stored in the clustering module 30 when packets are input.

In addition, the port table 312 is included in a cluster information database (DB) 31 and stores connection relationships between each of the clusters classified by clustering and ports. The cluster table 311 is also included in the cluster information DB 31 to manage the clusters, and in this case, stores and manages header lengths estimated according to the clusters.

Accordingly, the substring extraction module 10 reads and operates corresponding cluster information and application header length information from the cluster table 311 and the port table 312 when packets are input.

In addition, the prevalent content position table 32 is provided to each of the ports to estimate an application header length and manages a frequency of a position prevalence substring of each port.

Figure 2:
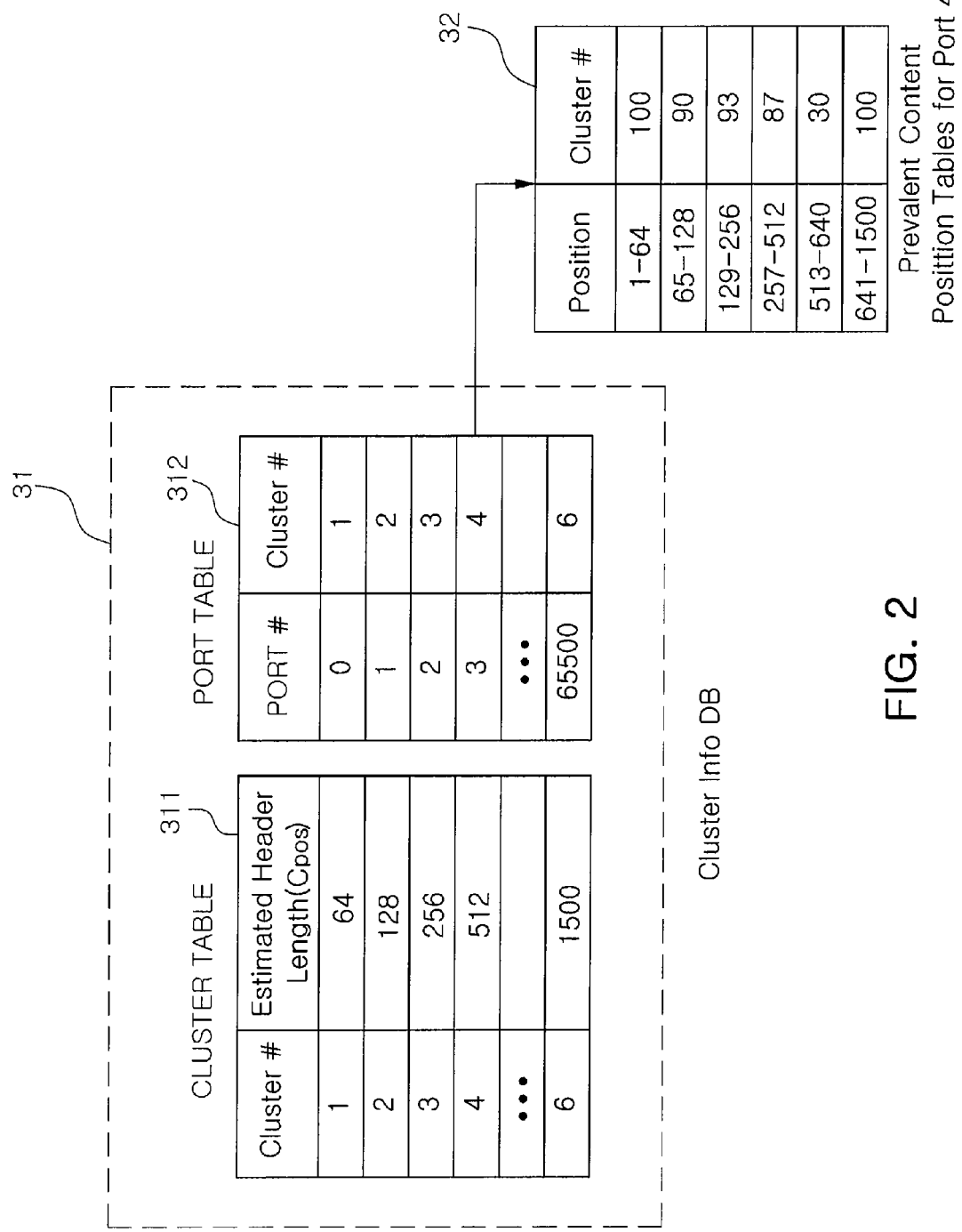
FIG. 2 is a table diagram illustrating a structure of a cluster information database (DB) used to generate a network attack signature according to an embodiment of the present invention.

FIG. 2 illustrates an example of the cluster table 311, the port table 312, and the prevalent content position table 32. The cluster table 311 records a header length Cpos estimated for each cluster, and the port table 312 matches and manages each cluster with an associated port. Here, a prevalent content position table 32 is generated for each port managed by the port table 312. The prevalent content position table 32 is a means for recording a position where a substring of a frequency of a predetermined value or more occur in the header and data prevalence tables 11 and 12 according to ports or sessions. This is managed as a frequency of occurrence according to the positions or sessions.

The clustering module 30 retrieves the prevalent content position table 32 to check a position showing a change of a predetermined value or more and estimate an application header length according to the ports and periodically performs clustering on the ports on the basis of the estimated application header length.

When the substring extraction and the byte distribution examination for all packets in a set section are completed by the substring extraction module 10, the signature generation module 20 checks the accumulated byte distributions to generate an attack signature with reference to substrings having a frequency of a predetermined value or more. Here, the attack signature is generated by using the substring of the application data, and the substring of the application header is used as attribute classification supporting information on the generated attack signature.

Figure 3:
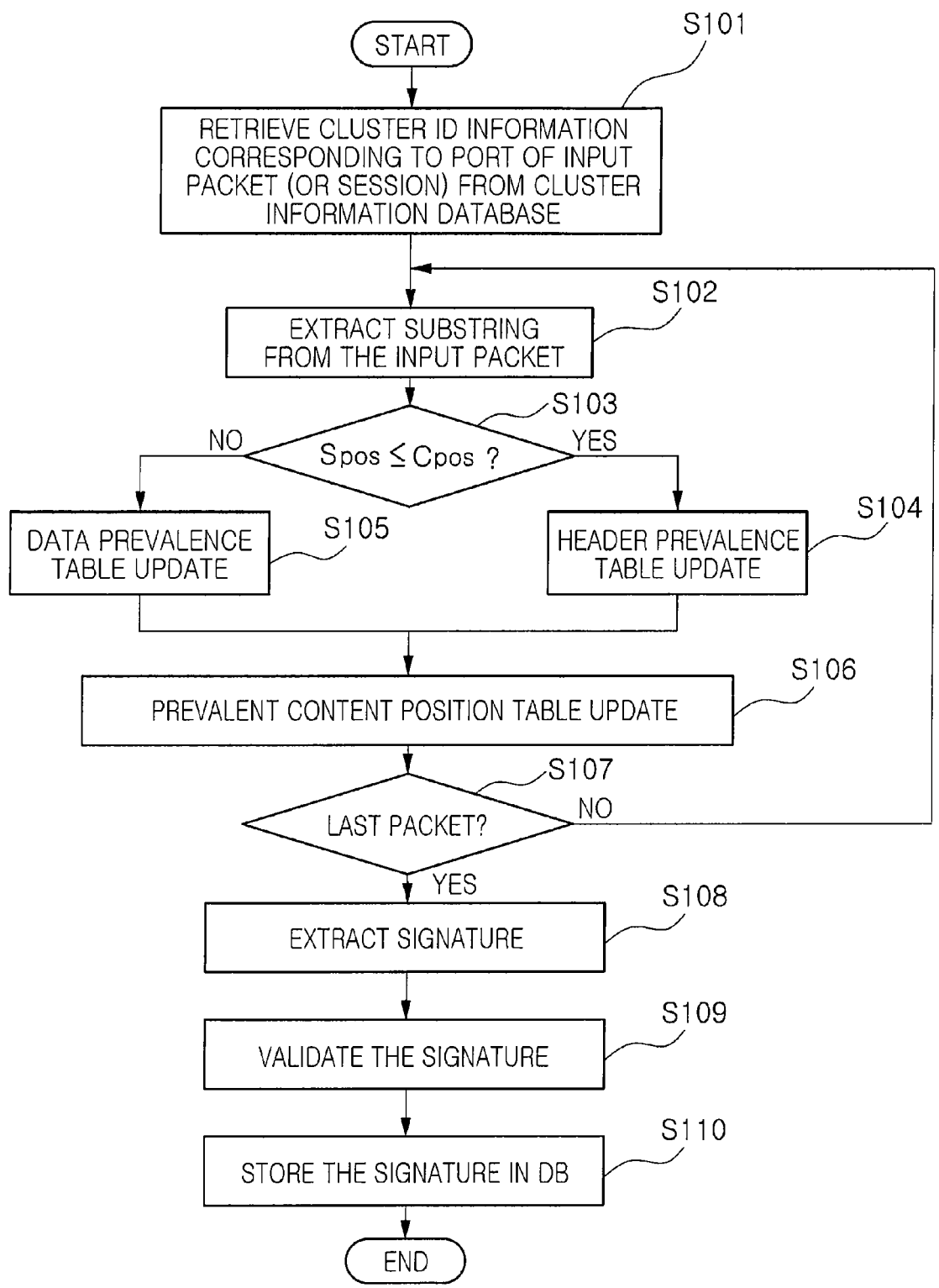
FIG. 3 is a flowchart of a method of generating a network attack signature according to an embodiment of the present invention.
Figure 4:
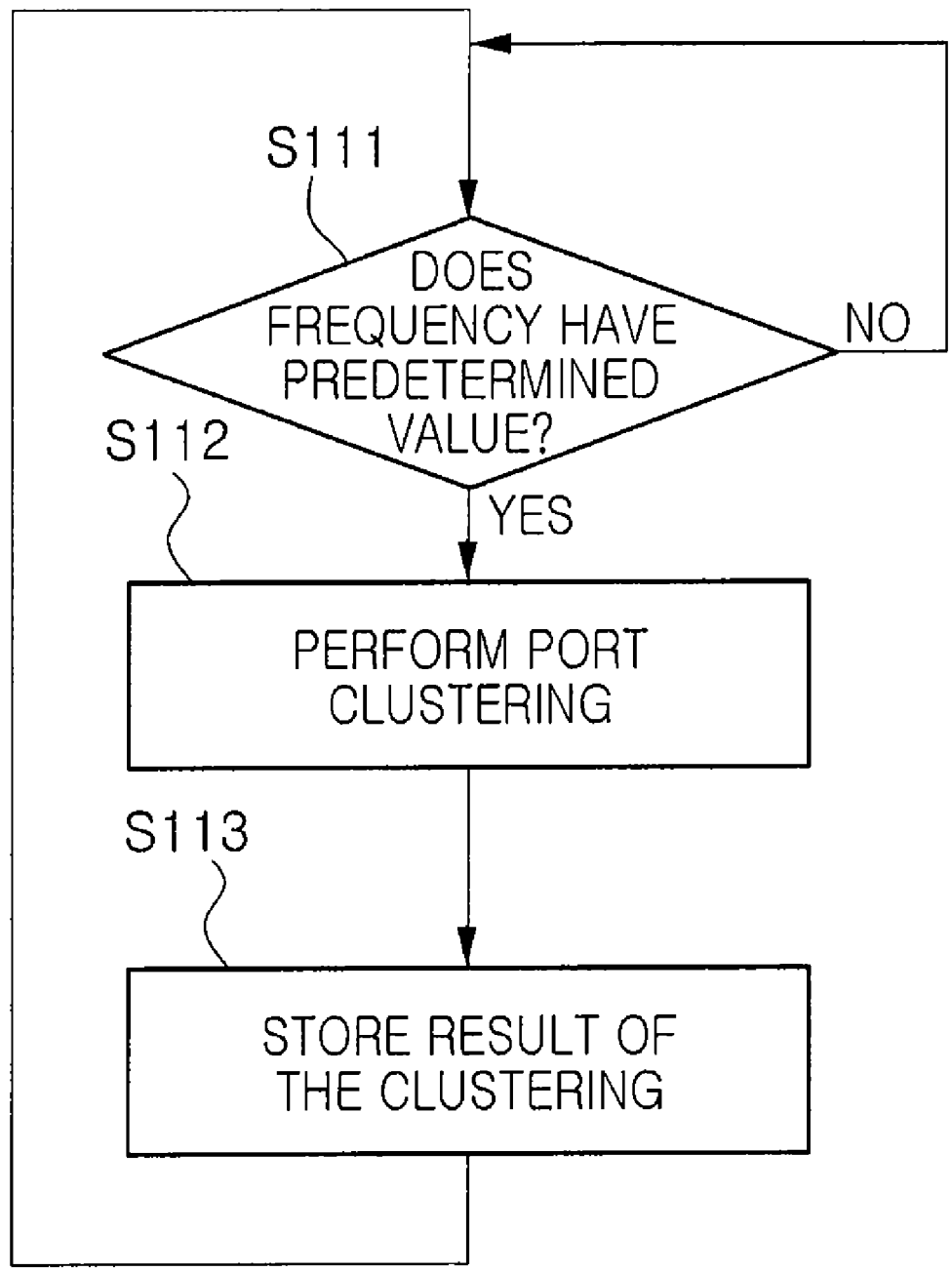
FIG. 4 is a flowchart of clustering operations in the method of generating a network attack signature according to an embodiment of the present invention.

FIGS. 3 and 4 are flowcharts for explaining the aforementioned operations of the apparatus for generating the network attack signature, that is, a method of generating the network attack signature. The operations of generating the network attack signature according to the embodiment of the present invention will be described in detail.

According to the embodiment of the present invention, the operations can be performed in units of a packet or a session. For the operations in units of a session, an operation of combining packets in units of a session is needed. Hereinafter, for the convenience of description, the operations in units of a packet are mainly described, and an order and a principle of the operations can be applied to the operations in units of a session.

The method of generating a signature according to the embodiment of the present invention includes: extracting substrings by separating an application header and application data from all input packets to be examined and examining byte distributions on the basis of the extracted substrings; generating an attack signature by using a substring having a frequency of a predetermined value or more from the examined byte distribution; and estimating an application header length that is a basis for separating the application header from the application data and clustering and managing ports on the basis of the estimated application header length.

First, the byte distribution examination operations and the signature generation operations in the method of generating the network attack signature according to the embodiment of the present invention are described in detail with reference to FIG. 3.

Referring to FIG. 3, in order to examine the byte distribution, cluster identification (ID) information is retrieved from all input packets that are to be examined (a session to which packets belong in the operations in units of a session) (operation S101). Specifically, the cluster table 311 and the port table 312 in the cluster information DB 31 illustrated in FIG. 2 are retrieved by using a port ID of the input packet, and an associated cluster ID and an application header length Cpos estimated from a corresponding cluster are obtained.

Next, a substring is extracted from the input packet (operation S102). Here, the substring means a byte-sequence having a predetermined length from a starting portion of a payload of a packet. The extracted substring is used to index the header prevalence table 11 and the data prevalence table 12 corresponding to an associated cluster. Here, as an index method, hashing method and an index method using a string value can be used. One is selected from the two methods according to a length of the substring and an available memory size.

Returning to FIG. 3, more specifically, in order to classify the substrings into the application header and the application data, a substring is extracted from an input packet (operation S102), and a position $S_{pos}$ of the extracted substring in a packet is compared with the estimated application header length $C_{pos}$ to determine which one is larger (operation S103)

According to a result of the comparing, when the position $S_{pos}$ of the extracted substring in the packet is smaller than or equal to the estimated header length $C_{pos}$, the substring is classified as the application header, and the header prevalence table 11 is updated by using the extracted substring (operation S104).

On the other hand, according to a result of the comparing, when the position $S_{pos}$ of the extracted substring in the packet is larger than the estimated header length $C_{pos}$, the data prevalence table 12 is updated by using the substring (operation S105).

Here, updating the header/data prevalence tables 11 and 12 is performed to increase a frequency of occurrence of the corresponding substring.

In addition, in order to estimate the application header length, an occurrence position value of the substring of a frequency of a predetermined value or more in the prevalent content position table 32 updates according to the ports and sessions with reference to the updated header/data prevalence tables 11 and 12 (operation S106). Specifically, when the frequency is more than a predetermined value (here, values applied to the header prevalence table 11 and the data prevalence table 12 may be different from each other. For example, a reference value $th_{header\_pos\_update}$ is applied to the header prevalence table 11 and a reference value $th_{data\_pos\_update}$ is applied to the data prevalence table 12) after the header/data prevalence tables 11 and 12 are updated, the position $S_{pos}$ of the corresponding substring in the packet is accumulated in the prevalent content position table 32. Here, the prevalent content position table 32 may be divided into sections having predetermined lengths such as 0-64, 65-128, and 129-256 so as to be managed. For this, a simple hash function may be used.

Operations S101 to 106 are repeatedly performed to examine the last packet. As a result, when the last packet is examined (operation S107), an attack signature based on the accumulated header/data prevalence tables 11 and 12 is generated.

Specifically, when the substring extraction and the byte distribution examination are performed on the last packet and therefore completed, a sequence of substrings (abnormal substrings) having a frequency of a predetermined value or more (here, as described above, different values are applied to the header and data prevalence tables) is extracted from each of the header prevalence table 11 and the data prevalence table 12 (operation S108). In this operation, a method of searching for abnormal substrings in consideration of the byte distribution according to each cluster may be used. Here, in the substring combination extracted as described above, the substring generated by the header prevalence table 11 is used as supporting information on a signature to distinguish an attribute of an application of a corresponding packet (session) and the substring generated by the data prevalence table 12 is used to generate a practical attack signature.

Last, a signature DB (not shown) is updated by checking whether or not the generated signature is registered in advance (operations S109 and S110).

While the byte distribution examination and the signature generation are performed, port clustering may be periodically performed. FIG. 4 is a flowchart of clustering operations in the method of generating the network attack signature according to the embodiment of the present invention.

Referring to FIG. 4, it is checked whether or not the predetermined frequency is reached in advance while operations S101 to S110 are performed (operation S111).

As a result of the checking, when the predetermined frequency is reached, the port clustering is performed (operation S112), and a result of the performing is stored in the cluster information DB 31 (operation S113).

Here, the port clustering is performed on the basis of the application header lengths according to ports, and therefore, an application header length of each cluster is determined.

The application header length is a section in which a change in a value of the frequency of the prevalent content position table 32 of a corresponding port is more than a predetermined value. Here, a change point detection scheme that is widely used such as a method of using a moving average may be used.

Accordingly, the prevalent content position table 32 of each port is analyzed to check an application header length of each port, ports are clustered according to the checked application header lengths, associated information is stored in the port table 312, and an application header value of each cluster is stored in the cluster table 311.

The clustering operations are performed to solve a problem of excessively increasing a memory usage when the header/data prevalence tables 11 and 12 are managed according to each port. Namely, the clustering operations mean dividing all ports or sessions into several groups. Here, a hierarchical clustering, a K-mean method, and the like may be used.

In the aforementioned method, an example of operations of generating and using clustering information will be described with reference to FIG. 2.

It is assumed that a port number of a packet to be examined is 3.

First, in order to examine the byte distribution according to the clusters, cluster ID information associated with the packet is searched for. Here, the port table 312 illustrated in FIG. 2 is retrieved to read a cluster ID 4 corresponding to the port number 3 of the packet, and by accessing the cluster table 311, it can be seen that an application header length of the corresponding cluster is 512 bytes.

Therefore, a substring that is extracted from the packet and has a position value of equal to or less than 512 bytes is accumulated in the header prevalence table corresponding to the cluster number 4, and a substring that is extracted from a position of more than 512 bytes in the input packet is accumulated in the data prevalence table.

In addition, when the value accumulated in the header/data prevalence tables 11 and 12 reaches a predetermined value, the prevalent content position table 32 corresponding to the port number 3 is updated.

The clustering is periodically performed on the basis of the application header length. To do this, a section in which a change in the frequency is large is retrieved from the prevalent content position table corresponding to each port number. Specifically, referring to the prevalent content position table 32 corresponding to the port number 3 illustrated in FIG. 2, it can be seen that a change in a section 513-640 is largest, so that the port number 3 has a header length of 512.

After the calculation of a header length is performed on all ports, the ports are re-clustered, and the cluster table 311 and the port table 312 are updated.

Accordingly, when an attack signature is generated to detect an attack packet in a high-speed network and protect the network from an attack that may occur, a reliability of the signature can be increased by separating a protocol header from a packet or a session, and a whitelist can be minimized. In addition, a resource needed to separate the protocol header, that is, a memory usage can be minimized by using the clustering technique.

In addition, the signature generated according to the embodiment of the present invention can have a high reliability by separating the protocol header, and it is easy to define attack objects and methods by using supporting information (protocol header information) on the generated signature.

The embodiments of the present invention can be written as programs to be used as a portion of a router of a network or a security apparatus of the network. In addition, the present invention can be implemented in hardware so as to be used in a superhigh-speed network such as application-specific integrated circuit (ASIC) and field-programmable gate array (FPGA).

While the present invention has been shown and described in connection with the exemplary embodiments, it will be apparent to those skilled in the art that modifications and variations can be made without departing from the spirit and scope of the invention as defined by the appended claims.

What is claimed is:

1. A method of generating a network attack signature comprising:
   measuring byte distributions of an input packet by separating an application header from application data; and
   extracting an attack signature by combining the measured byte distribution of the application header with the byte distribution of the application data,
   wherein, in the extracting of the attack signature, the attack signature is generated by using substrings of the application data, and substrings of the application header is used as attribute classification supporting information on the generated attack signature, and
   wherein the measuring byte distributions step comprises:
     estimating an application header length according to ports or sessions;
     extracting the substrings from the input packet;
     classifying the extracted substrings into substrings of the application data and substrings of the application header by using the estimated application header length corresponding to the input packet; and
     updating the substrings in a header prevalence table for managing the byte distribution of the application header and in a data prevalence table for managing the byte distribution of the application data according to the classification.

2. The method of claim 1, wherein in the measuring byte distributions step, a distribution of the substring is measured according to a length of the substring and an available memory size or a distribution of a value obtained by hashing the substring is measured.

3. The method of claim 1, wherein in the measuring byte distributions step, an integrated distribution for the entire flow is measured.

4. The method of claim 1, wherein in the measuring byte distributions step, the byte distribution is measured according to the ports.

5. The method of claim 1, further comprising periodically clustering the ports,
   wherein in the measuring byte distributions, the byte distribution is measured according to clusters.

6. The method of claim 5, wherein the clustering the ports step comprises storing connection relationships between the ports and each cluster after clustering the ports.

7. The method of claim 1, wherein in the estimating an application header length step, a position distribution in a packet or a session in which the substring extracted according to the ports occurs is obtained, and the application header length according to the ports is estimated by selecting a section in which a change in the position distribution is larger than a predetermined value.

8. The method of claim 7, wherein the position distribution is a distribution of a substring number which starts at each position on a 4 layer payload.

9. The method of claim 7, wherein the change in the distribution is measured by using a change point detection scheme.

10. The method of claim 8, wherein the position distribution is obtained as a distribution according to positions or a distribution according to position sections according to an available memory size.

11. The method of claim 6, wherein the clustering the ports is periodically performed on the basis of an application header length estimated according to the ports.

12. The method of claim 11, wherein the clustering the ports step is performed by using a hierarchical clustering scheme or a k-mean scheme.

13. An apparatus for generating a network attack signature, the apparatus comprising:
   a substring extraction module configured to extract, using a micro-processor, substrings from an input packet, classify the substrings into an application header and application data, and measure byte distributions of the extracted substrings;

a signature generation module configured to generate, using a micro-processor, an attack signature from a substring having a frequency of a predetermined value or more by combining the byte distribution of the application header and the byte distribution of the application data measured by the substring extraction module; and a clustering module periodically clustering the ports using a micro-processor, wherein the substring extraction module measures a byte distribution according to clusters by checking corresponding cluster information stored in the clustering module, wherein the signature generation module generates the attack signature by using the substrings of the application data and uses the substrings of the application header as attribute classification supporting information on the generated attack signature, and wherein the clustering module further comprises:
- a port table for storing connection relationships between the clusters and the ports
- a cluster table to manage an application header length estimated according to the clusters; and
- a prevalent content position table, which is included in each port and manages a frequency of occurrence of a prevalence substring according to a position of each port, wherein an application header length according to the ports is estimated by checking a position showing a change of a predetermined value or more in the prevalent content position table.

14. The apparatus of claim 13, further comprising:
- a header prevalence table to manage frequencies of the substrings classified by the substring extraction module into the application header; and
- a data prevalence table to manage frequencies of the substrings classified by the substring extraction module into the application data.

15. The apparatus of claim 13, wherein the substring extraction module classifies the extracted substrings on the basis of an application header length estimated according to ports or sessions.

16. The apparatus of claim 13, wherein the substring extraction module measures a byte distribution of a substring according to flow or ports.

17. The apparatus of claim 13, wherein the clustering module periodically performs the clustering on the ports on the basis of the application header length estimated according to the ports.

* * * * *